(12) United States Patent
Hsu et al.

(10) Patent No.: US 12,249,913 B2
(45) Date of Patent: Mar. 11, 2025

(54) OPEN-LOOP INDUCTOR CURRENT EMULATING CIRCUIT

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 277 days.

(21) Appl. No.: 17/991,802

(22) Filed: Nov. 21, 2022

(65) Prior Publication Data

US 2024/0097569 A1 Mar. 21, 2024

(30) Foreign Application Priority Data

Sep. 19, 2022 (TW) .................................. 111135263

(51) Int. Cl.
*H02M 3/158* (2006.01)
*H02M 1/00* (2007.01)

(52) U.S. Cl.
CPC .......... *H02M 3/158* (2013.01); *H02M 1/0009* (2021.05)

(58) Field of Classification Search
CPC ............................ H02M 3/158; H02M 1/0009
See application file for complete search history.

(56) References Cited

U.S. PATENT DOCUMENTS

2015/0222171 A1* 8/2015 Nguyen .................. H02M 1/08
323/282
2021/0099080 A1* 4/2021 Chen ..................... H02M 3/155

* cited by examiner

*Primary Examiner* — Jue Zhang
(74) *Attorney, Agent, or Firm* — Li & Cai Intellectual Property Office (57) ABSTRACT

An open-loop inductor current emulating circuit is provided. A current sensor circuit senses a current flowing through a first terminal of a low-side switch to output a current sensed signal. An emulation controller circuit outputs a plurality of charging current signals according to currents of a plurality of rising waveforms of the current sensed signal. The emulation controller circuit outputs a plurality of discharging current signals according to currents of a plurality of falling waveforms of the current sensed signal. A charging and discharging circuit generates a plurality of charging currents according to the charging current signals, and generates a plurality of discharging currents according to the discharging current signals. The charging and discharging circuit alternatively outputs the charging currents and the discharging currents to the capacitor to charge and discharge the capacitor multiple times, thereby achieving a purpose of emulating an inductor current.

15 Claims, 9 Drawing Sheets

OPEN-LOOP INDUCTOR CURRENT EMULATING CIRCUIT

CROSS-REFERENCE TO RELATED PATENT APPLICATION

This application claims the benefit of priority to Taiwan Patent Application No. 111135263, filed on Sep. 19, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to an open-loop inductor current emulating circuit that is applicable to a power converter.

BACKGROUND OF THE DISCLOSURE

Power converters are indispensable devices for electronic devices. The power converters are used to adjust power and supply the adjusted power to the electronic devices. If an output terminal of the power converter intents to supply power suitable for the electronic device connected thereto, high-side switches and low-side switches of the power converter must be switched according to voltages, currents or other data of circuit components of the power converter. However, a conventional detector circuit is not able to precisely and instantly detect an inductor current of the power converter and thus the detected inductor current needs to be further corrected.

SUMMARY OF THE DISCLOSURE

In response to the above-referenced technical inadequacies, the present disclosure provides an open-loop inductor current emulating circuit. The open-loop inductor current emulating circuit is applicable to a power converter. The power converter includes a driver circuit, a high-side switch, a low-side switch, an inductor and an output capacitor. An output terminal of the driver circuit is connected to a control terminal of the high-side switch and a control terminal of the low-side switch. A first terminal of the high-side switch is coupled to an input voltage. A second terminal of the high-side switch is connected to a first terminal of the low-side switch. A second terminal of the low-side switch is grounded. A node between the second terminal of the high-side switch and the first terminal of the low-side switch is connected to a first terminal of the inductor. A second terminal of the inductor is connected to a first terminal of the output capacitor. A second terminal of the output capacitor is grounded. The open-loop inductor current emulating circuit includes a current sensor circuit, an emulation controller circuit and a charging and discharging circuit. The current sensor circuit is connected to the first terminal of the low-side switch. The current sensor circuit is configured to sense a current flowing through the first terminal of the low-side switch to output a current sensed signal. A plurality of waveform segments of a plurality of waveforms of the current sensed signal includes a plurality of rising waveform segments and a plurality of falling waveform segments. The emulation controller circuit is connected to the current sensor circuit. The emulation controller circuit is configured to output a plurality of charging current signals respectively according to a plurality of currents on the plurality of rising waveform segments of the current sensed signal. The emulation controller circuit is configured to output a plurality of discharging current signals respectively according to a plurality of currents of the plurality of falling waveform segments of the current sensed signal. The charging and discharging circuit is connected to the emulation controller circuit and a first terminal of a capacitor. A second terminal of the capacitor is grounded. The charging and discharging circuit is configured to generate a plurality of charging currents respectively according to the plurality of charging current signals. The charging and discharging circuit is configured to generate a plurality of discharging currents respectively according to the plurality of discharging current signals. The charging and discharging circuit is configured to alternatively output the plurality of charging current signals and the plurality of discharging currents to the capacitor to charge and discharge the capacitor multiple times. A current signal of the capacitor that is charged and discharged multiple times is an emulated voltage signal of an inductor current of the inductor.

In certain embodiments, the open-loop inductor current emulating circuit further includes an initial control circuit. The initial control circuit is connected to the emulation controller circuit and the first terminal of the capacitor. The emulation controller circuit generates an initial signal according to a valley current of the current sensed signal. The initial control circuit transits the initial signal from the emulation controller circuit to the capacitor to pull down a voltage of a voltage signal of the capacitor to a valley voltage.

In certain embodiments, the initial control circuit includes a switch component. A first terminal of the switch component is connected to an output terminal of the emulation controller circuit. A second terminal of the switch component is connected to the first terminal of the capacitor. A control terminal of the switch component receives a valley time pulse signal from an external circuit. The switch component is turned on or off according to a level of the valley time pulse signal.

In certain embodiments, the emulation controller circuit includes a sample and hold circuit. The sample and hold circuit is configured to sample and hold the plurality of currents on the plurality of waveform segments of the current sensed signal.

In certain embodiments, the plurality of currents being sampled and held by the sample and hold circuit include one or more valley currents on the plurality of waveform segments of the current sensed signal.

In certain embodiments, the plurality of currents being sampled and held by the sample and hold circuit include a current that is generated when a current time reaches half of an on-time of the low-side switch.

In certain embodiments, the emulation controller circuit further includes a sensed current difference calculator circuit. The sensed current difference calculator circuit is connected to the sample and hold circuit. The sample and hold circuit samples and holds a first current at a first time point on each of the plurality of waveform segments of the current sensed signal. The sample and hold circuit samples and holds a second current at a second time point on each of the plurality of waveform segments of the current sensed signal. The sensed current difference calculator circuit calculates a current difference between the first current and the second current.

In certain embodiments, the emulation controller circuit further includes a slope current calculator circuit. The slope current calculator circuit calculates a time difference between the first time point and the second time point on each of the plurality of waveform segments of the current sensed signal. The slope current calculator circuit calculates a slope and currents of each of the plurality of waveform segments of the current sensed signal, according to the current difference and the time difference on each of the plurality of waveform segments of the current sensed signal.

In certain embodiments, the slope current calculator circuit outputs each of the plurality of charging current signals, according to the slope and the currents of each of the plurality of rising waveform segments of the current sensed signal. The slope current calculator circuit outputs each of the plurality of discharging current signals, according to the slope and the currents of each of the plurality of falling waveform segments of the current sensed signal.

In certain embodiments, the charging and discharging circuit includes a first charging current mirror. An input terminal of the first charging current mirror is connected to an output terminal of the emulation controller circuit, and configured to receive each of the plurality of charging current signals. An output terminal of the first charging current mirror is connected to the first terminal of the capacitor.

In certain embodiments, the charging and discharging circuit further includes a second charging current mirror. An input terminal of the second charging current mirror is connected to an output terminal of the first charging current mirror. An output terminal of the second charging current mirror is connected to the first terminal of the capacitor.

In certain embodiments, the charging and discharging circuit further includes a charging switch. A first terminal of the charging switch is connected to the output terminal of the second charging current mirror. A second terminal of the charging switch is connected to the first terminal of the capacitor. A control terminal of the charging switch is connected to the driver circuit. The driver circuit turns on the high-side switch and the charging switch at the same time.

In certain embodiments, the first charging current mirror includes a first transistor and a second transistor. A first terminal of the first transistor is connected to the output terminal of the emulation controller circuit. A control terminal of the first transistor and a control terminal of the second transistor. A first terminal of the second transistor is connected to the input terminal of the second charging current mirror. A second terminal of the first transistor and a second terminal of the second transistor are grounded.

In certain embodiments, the second charging current mirror includes a third transistor and a fourth transistor. A first terminal of the third transistor and a first terminal of the fourth transistor are coupled to a common voltage. A second terminal of the third transistor is connected to the first terminal of the second transistor. A control terminal of the third transistor and a control terminal of the fourth transistor. A second terminal of the fourth transistor is connected to the first terminal of the charging switch.

In certain embodiments, the charging and discharging circuit includes a first discharging current mirror. An input terminal of the first discharging current mirror is connected to an output terminal of the emulation controller circuit, and configured to receive each of the plurality of discharging current signals. An output terminal of the first discharging current mirror is connected to the first terminal of the capacitor.

In certain embodiments, the charging and discharging circuit further includes a discharging switch. A first terminal of the discharging switch is connected to the output terminal of the first discharging current mirror. A second terminal of the discharging switch is connected to the first terminal of the capacitor. A control terminal of the discharging switch is connected to the driver circuit. The driver circuit turns on the low-side switch and the discharging switch at the same time.

In certain embodiments, the first discharging current mirror includes a first transistor and a second transistor. A first terminal of the first transistor is connected to the output terminal of the emulation controller circuit. A control terminal of the first transistor and a control terminal of the second transistor. A first terminal of the second transistor is connected to the first terminal of the discharging switch. A second terminal of the first transistor and a second terminal of the second transistor are grounded.

As described above, the present disclosure provides the open-loop inductor current emulating circuit. Configurations of the open-loop inductor current emulating circuit are different from that of the conventional inductor current emulating circuit. The open-loop inductor current emulating circuit of the present disclosure detects the currents of the rising waveform segments and the falling waveform segments of the plurality of waveforms of the current sensed signal of the low-side switch of the power converter. The open-loop inductor current emulating circuit of the present disclosure accurately and quickly emulates complete information of the inductor current according to the detected currents.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
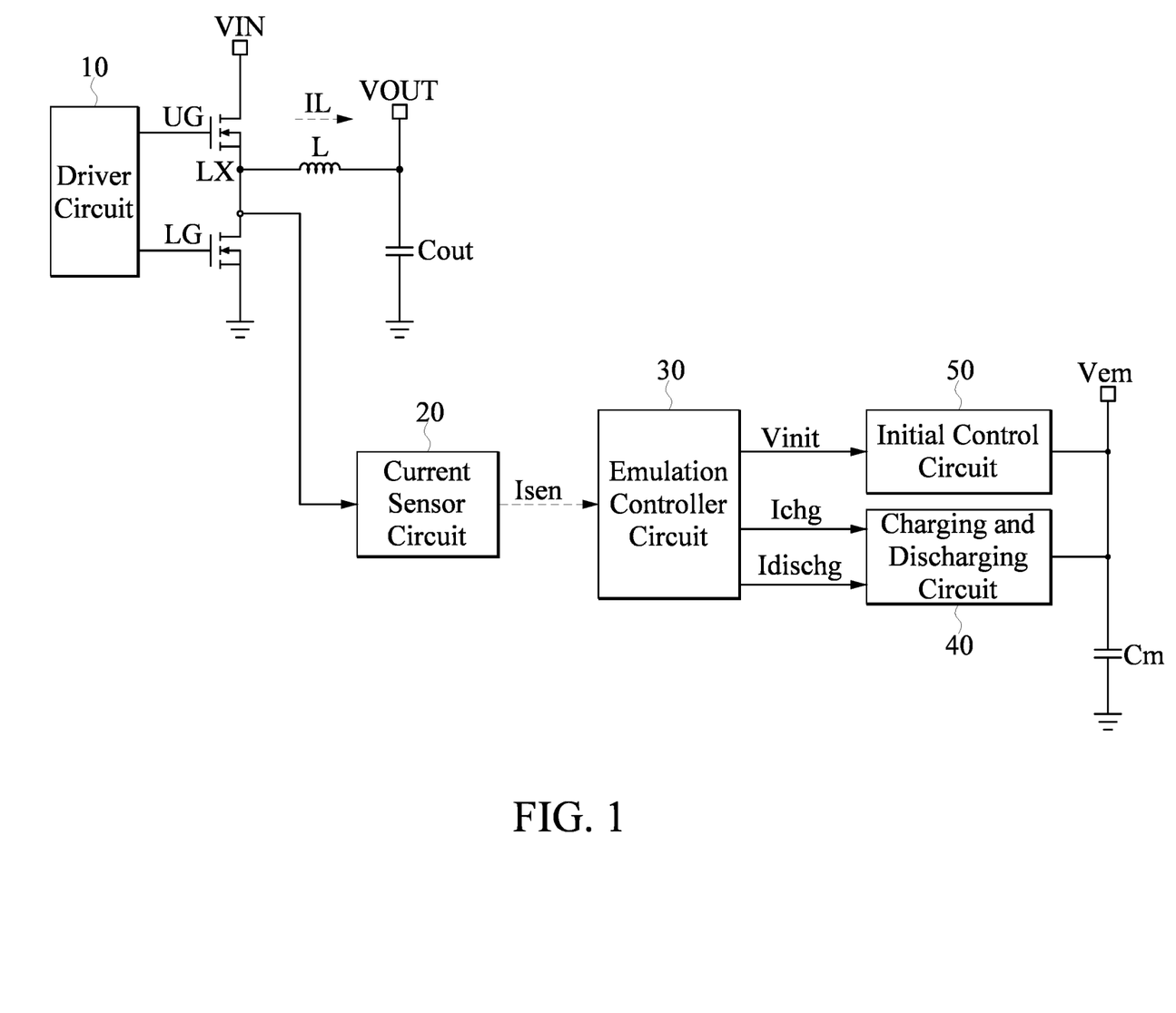
FIG. 1 is a block diagram of an open-loop inductor current emulating circuit according to a first embodiment of the present disclosure.

Reference is made to FIG. 1, which is a block diagram of an open-loop inductor current emulating circuit according to a first embodiment of the present disclosure.

The open-loop inductor current emulating circuit of the embodiment of the present disclosure is applicable to emulate a current of an inductor L of a power converter that is represented by an inductor current IL as shown in FIG. 1 to generate an emulated voltage signal.

The power converter includes a driver circuit 10, a high-side switch UG, a low-side switch LG, the inductor L and an output capacitor Cout. An output terminal of the driver circuit 10 is connected to a control terminal of the high-side switch UG and a control terminal of the low-side switch LG. A first terminal of the high-side switch UG is coupled to an input voltage VIN. A second terminal of the high-side switch UG is connected to a first terminal of the low-side switch LG. A second terminal of the low-side switch LG is grounded.

A node LX between the second terminal of the high-side switch UG and the first terminal of the low-side switch LG is connected to a first terminal of the inductor L. A second terminal of the inductor L is connected to a first terminal of the output capacitor Cout. A second terminal of the output capacitor Cout is grounded. A voltage of a node between the second terminal of the inductor L and the first terminal of the output capacitor Cout is an output voltage VOUT of the power converter.

It is worth noting that, the open-loop inductor current emulating circuit of the embodiment of the present disclosure may include a current sensor circuit 20, an emulation controller circuit 30 and a charging and discharging circuit 40. If necessary, the open-loop inductor current emulating circuit may further include an initial control circuit 50.

An input terminal of the current sensor circuit 20 is connected to the first terminal of the low-side switch LG. An output terminal of the current sensor circuit 20 is connected to an input terminal of the emulation controller circuit 30. An output terminal of the emulation controller circuit 30 is connected to an input terminal of the charging and discharging circuit 40 and an input terminal of the initial control circuit 50. An output terminal of the charging and discharging circuit 40 is connected to a first terminal of a capacitor Cm. A second terminal of the capacitor Cm is grounded.

First, the current sensor circuit 20 senses a current flowing through the first terminal of the low-side switch LG to output a current sensed signal Isen. A plurality of waveform segments of a plurality of waveforms of the current sensed signal Isen include a plurality of rising waveform segments and a plurality of falling waveform segments.

The emulation controller circuit 30 outputs a plurality of charging current signals Ichg respectively according to a plurality of currents on the plurality of rising waveform segments of the current sensed signal Isen. The emulation controller circuit 30 outputs a plurality of discharging current signals Idischg respectively according to a plurality of currents on the plurality of falling waveform segments of the current sensed signal Isen.

The charging and discharging circuit 40 generates a plurality of charging currents respectively according to the plurality of charging current signals Ichg from the emulation controller circuit 30. The charging and discharging circuit 40 generates a plurality of discharging currents respectively according to the plurality of discharging current signals Idischg from the emulation controller circuit 30. The charging and discharging circuit 40 alternatively outputs the plurality of charging current signals and the plurality of discharging currents to the capacitor Cm to charge and discharge the capacitor Cm multiple times. After the capacitor Cm is charged and discharged multiple times, a voltage signal of the capacitor Cm becomes the emulated voltage signal that is generated according to the inductor current IL of the power converter by the open-loop inductor current emulating circuit of the embodiment of the present disclosure.

Each time when the charging and discharging circuit 40 provides the discharging current to the capacitor Cm according to the discharging current signal Idischg to discharge the voltage signal of the capacitor Cm to reach a time point of a valley value of the inductor current IL, the emulation controller circuit 30 may output an initial signal Vinit to the initial control circuit 50 according to a valley current of the discharging current signal Idischg. The initial control circuit 50 transmits the initial signal Vinit from the emulation controller circuit 30 to the capacitor Cm to pull down a voltage of the voltage signal of the capacitor Cm to a valley voltage. As a result, the open-loop inductor current emulating circuit of the embodiment of the present disclosure more smoothly emulates the inductor current IL of the power converter to generate the emulated voltage signal.

Figure 2:
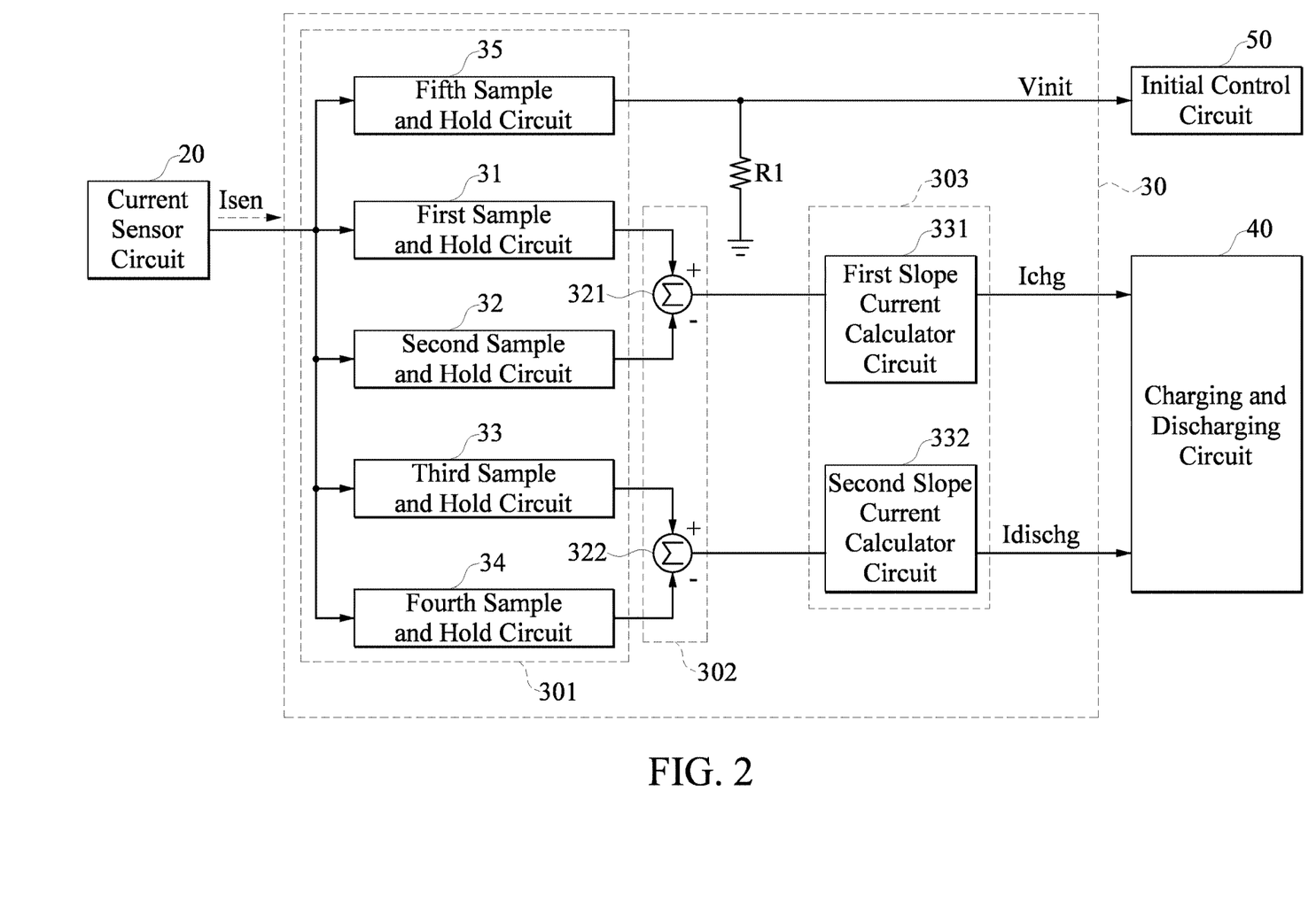
FIG. 2 is a block diagram of an open-loop inductor current emulating circuit according to a second embodiment of the present disclosure.
Figure 3:
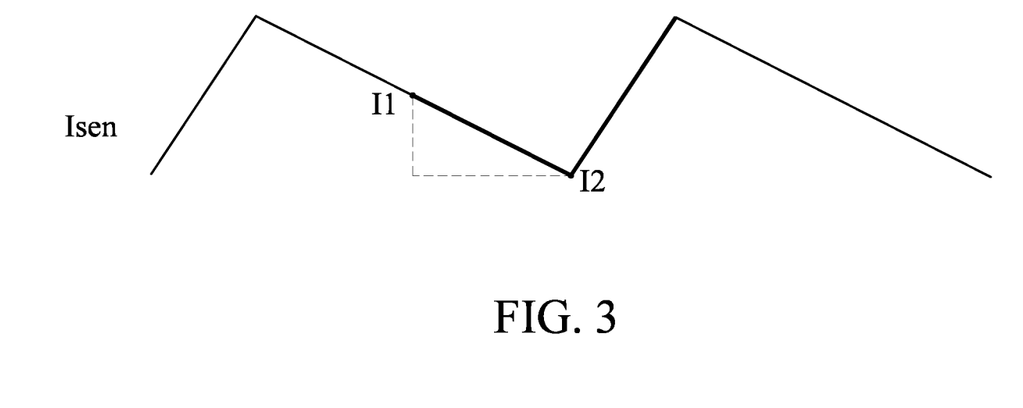
FIG. 3 is a waveform diagram of a current sensed signal sensed by the open-loop inductor current emulating circuit according to the second embodiment of the present disclosure.

Reference is made to FIGS. 2 and 3, in which FIG. 2 is a block diagram of an open-loop inductor current emulating circuit according to a second embodiment of the present disclosure, and FIG. 3 is a waveform diagram of a current sensed signal sensed by the open-loop inductor current emulating circuit according to the second embodiment of the present disclosure.

The open-loop inductor current emulating circuit of embodiment of the present disclosure may include emulation controller circuit 30 as shown in FIG. 2. The emulation controller circuit 30 shown in FIG. 1 may be the same as that shown in FIG. 2, but the present disclosure is not limited thereto.

As shown in FIG. 2, the emulation controller circuit 30 may include a sample and hold circuit 301, a sensed current difference calculator circuit 302 and a slope current calculator circuit 303. In practice, the sensed current difference calculator circuit 302 and the slope current calculator circuit 303 may be integrated into a single calculator circuit. If necessary, the emulation controller circuit 30 may further include a first resistor R1.

The sample and hold circuit 301 of the emulation controller circuit 30 is connected to the current sensor circuit 20, the sensed current difference calculator circuit 302 of the emulation controller circuit 30, the initial control circuit 50, and a first terminal of the first resistor R1. A second terminal of the first resistor R1 is grounded. The slope current calculator circuit 303 of the emulation controller circuit 30 is connected to the sensed current difference calculator circuit 302 of the emulation controller circuit 30, and is connected to the charging and discharging circuit 40.

The sample and hold circuit 301 of the emulation controller circuit 30 may be a single circuit. Alternatively, the sample and hold circuit 301 may include a plurality of sample and hold circuits such as, but not limited to a first sample and hold circuit 31, a second sample and hold circuit 32, a third sample and hold circuit 33, a fourth sample and hold circuit 34 and a fifth sample and hold circuit 35 as shown in FIG. 2.

The second sample and hold circuit 32 of the emulation controller circuit 30 may be a single circuit. Alternatively, the second sample and hold circuit 32 may include a plurality of arithmetic operators such as, but not limited to a first arithmetic operator 321 and a second arithmetic operator 322 as shown in FIG. 2.

The slope current calculator circuit 303 of the emulation controller circuit 30 may be a single circuit. Alternatively, the slope current calculator circuit 303 may include a plurality of slope current calculator circuits such as, but not limited to a first slope current calculator circuit 331 and a second slope current calculator circuit 332 as shown in FIG. 2.

As shown in FIG. 2, the first sample and hold circuit 31, the second sample and hold circuit 32, the third sample and hold circuit 33, the fourth sample and hold circuit 34 and the fifth sample and hold circuit 35 of the emulation controller circuit 30 are connected to the current sensor circuit 20.

In the emulation controller circuit 30, the first sample and hold circuit 31 and the second sample and hold circuit 32 of the sample and hold circuit 301 are connected to the first arithmetic operator 321 of the sensed current difference calculator circuit 302, and the first arithmetic operator 321 is connected to the first slope current calculator circuit 331 of the slope current calculator circuit 303. The first slope current calculator circuit 331 of the slope current calculator circuit 303 of the emulation controller circuit 30 is connected to the charging and discharging circuit 40.

In the emulation controller circuit 30, the third sample and hold circuit 33 and the fourth sample and hold circuit 34 of the sample and hold circuit 301 are connected to the second arithmetic operator 322 of the sensed current difference calculator circuit 302, and the second arithmetic operator 322 is connected to the second slope current calculator circuit 332 of the slope current calculator circuit 303. The second arithmetic operator 322 of the slope current calculator circuit 303 of the emulation controller circuit 30 is connected to the charging and discharging circuit 40.

The fifth sample and hold circuit 35 of the sample and hold circuit 301 of the emulation controller circuit 30 is connected to the first terminal of the first resistor R1. The initial control circuit 50 may be connected to the first terminal of the first resistor R1, or may be directly connected to the fifth sample and hold circuit 35.

First, the third sample and hold circuit 33 of the sample and hold circuit 301 of the emulation controller circuit 30 may sample and hold a current at a time point on each of the plurality of falling waveform segments of the plurality of waveforms of the current sensed signal Isen, as a first current of a first time point. For example, the first current, such as a current I1 of the current sensed signal Isen as shown in FIG. 3, may be a current that is generated when the current time reaches half of an on-time of the low-side switch LG shown in FIG. 1, but the present disclosure is not limited thereto.

The fourth sample and hold circuit 34 of the sample and hold circuit 301 of the emulation controller circuit 30 may sample and hold a current at a time point on each of the plurality of falling waveform segments of the plurality of waveforms of the current sensed signal Isen, as a second current of a second time point. For example, the second current may be a valley current I2 of the current sensed signal Isen as shown in FIG. 3, but the present disclosure is not limited thereto.

The second arithmetic operator 322 of the sensed current difference calculator circuit 302 of the emulation controller circuit 30 calculates a current difference between the first current at the first time point and the second current at the second time point on each of the plurality of falling waveform segments of the current sensed signal Isen.

The second slope current calculator circuit 332 of the slope current calculator circuit 303 of the emulation controller circuit 30 calculates a time difference between the first time point and the second time point on each of the plurality of falling waveform segments of the current sensed signal Isen.

The second slope current calculator circuit 332 of the slope current calculator circuit 303 of the emulation controller circuit 30, according to the current difference and the time difference on each of the plurality of falling waveform segments of the current sensed signal Isen, calculates a slope and currents of each of the plurality of falling waveform segments of the current sensed signal Isen.

The second slope current calculator circuit 332 of the slope current calculator circuit 303 of the emulation controller circuit 30 outputs the plurality of discharging current signals Idischg to the charging and discharging circuit 40, respectively according to the slopes and the currents of the plurality of falling waveform segments of the current sensed signal Isen. The charging and discharging circuit 40 generates the plurality of discharging currents respectively according to the plurality of discharging current signals Idischg.

The first sample and hold circuit 31 of the sample and hold circuit 301 of the emulation controller circuit 30 may sample and hold a current at a time point on each of the plurality of rising waveform segments of the plurality of waveforms of the current sensed signal Isen, as a first current of a first time point. For example, the second current may be a current of the current sensed signal Isen that is generated when the current time reaches half of the on-time of the low-side switch LG, but the present disclosure is not limited thereto.

The second sample and hold circuit 32 of the sample and hold circuit 301 of the emulation controller circuit 30 may sample and hold a current at a time point on each of the plurality of rising waveform segments of the plurality of waveforms of the current sensed signal Isen, as a second current of a second time point. For example, the second current may be a valley current of the current sensed signal Isen, but the present disclosure is not limited thereto.

The first arithmetic operator 321 of the sensed current difference calculator circuit 302 of the emulation controller circuit 30 calculates a current difference between the first current at the first time point and the second current at the second time point on each of the plurality of rising waveform segments of the current sensed signal Isen.

The first slope current calculator circuit 331 of the slope current calculator circuit 303 of the emulation controller circuit 30 calculates a time difference between the first time point and the second time point on each of the plurality of rising waveform segments of the current sensed signal Isen.

The first slope current calculator circuit 331 of the slope current calculator circuit 303 of the emulation controller circuit 30, according to the current difference and the time difference on each of the plurality of rising waveform segments of the current sensed signal Isen, calculates a slope and currents of each of the plurality of rising waveform segments of the current sensed signal Isen.

The first slope current calculator circuit 331 of the slope current calculator circuit 303 of the emulation controller circuit 30 outputs the plurality of charging current signals Ichg to the charging and discharging circuit 40, respectively according to the slopes and the currents of the plurality of rising waveform segments of the current sensed signal Isen. The charging and discharging circuit 40 generates the plurality of charging currents respectively according to the plurality of charging current signals Ichg.

In other words, the second slope current calculator circuit 332 of the slope current calculator circuit 303 of the emulation controller circuit 30 may perform the following equation:

$$T\text{off} = Ts \times (V\text{IN} - V\text{OUT})/V\text{IN};$$

$$|FS| = [(It1 - It2)]/(T\text{off}/2)$$

$$= 2 \times [(It1 - It2)] \times V\text{IN}/[Ts \times (V\text{IN} - V\text{OUT})];$$

wherein, Toff represents the on-time of the low-side switch LG, Ts represents a period of a high-side conduction signal UGS or a low-side conduction signal LGS, VIN represents an input voltage of the power converter, VOUT represents an output voltage of the power converter, FS represents the slope of the falling waveform segment of the current sensed signal Isen, It1 represents the first current at the first time point on each of the plurality of waveform segments (such as the current I1 of the current sensed signal Isen as shown in FIG. 3), and It2 represents the second current at the second time point on each of the plurality of waveform segments (such as the valley current I2 of the current sensed signal Isen as shown in FIG. 3).

The first slope current calculator circuit 331 of the slope current calculator circuit 303 of the emulation controller circuit 30 may perform the following equation:

$$|RS| = FS \times (V\text{IN} - V\text{OUT})/V\text{OUT}$$

$$= 2 \times [(It1 - It2)] \times V\text{IN}/(Ts \times V\text{OUT});$$

wherein, RS represents the slope of the rising waveform segment of the current sensed signal Isen, FS represents the slope of the falling waveform segment of the current sensed signal Isen, VIN represents the input voltage of the power converter, VOUT represents the output voltage of the power converter, It1 represents the first current at the first time point on each of the plurality of waveform segments (such as the current I1 of the current sensed signal Isen as shown in FIG. 3), It2 represents the second current at the second time point on each of the plurality of waveform segments (such as the valley current I2 of the current sensed signal Isen as shown in FIG. 3), and Ts represents the period of the high-side conduction signal UGS or the low-side conduction signal LGS.

The charging and discharging circuit 40 alternatively outputs the plurality of charging currents and the plurality of discharging currents to the capacitor Cm to charge and discharge the capacitor Cm multiple times. After the capacitor Cm is charged and discharged multiple times, the voltage signal of the capacitor Cm is the emulated voltage signal that is generated according to the inductor current IL of the power converter by the open-loop inductor current emulating circuit of the embodiment of the present disclosure.

The fifth sample and hold circuit 35 of the sample and hold circuit 301 of the emulation controller circuit 30 may sample and hold the valley current of the current sensed signal Isen to output the initial signal Vinit to the initial control circuit 50. Alternatively, the first sample and hold circuit 31 may provide the held valley current of the current sensed signal Isen to the first resistor R1 to charge the first resistor R1, and a voltage of the first resistor R1 being charged as the initial signal Vinit provided to the initial control circuit 50.

Each time when the charging and discharging circuit 40 provides the discharging current to the capacitor Cm according to the discharging current signal Idischg to discharge the voltage signal of the capacitor Cm to reach the time point of the valley value of the inductor current IL, the fifth sample and hold circuit 35 of the sample and hold circuit 301 of the emulation controller circuit 30 may output the initial signal Vinit according to the valley current of the discharging current signal Idischg. The initial control circuit 50 may transmit the initial signal Vinit from the emulation controller circuit 30 to the capacitor Cm to pull down the voltage of the voltage signal of the capacitor Cm to the valley voltage. As a result, the open-loop inductor current emulating circuit of the embodiment of the present disclosure more smoothly emulates the inductor current IL of the power converter to generate the emulated voltage signal.

Figure 4:
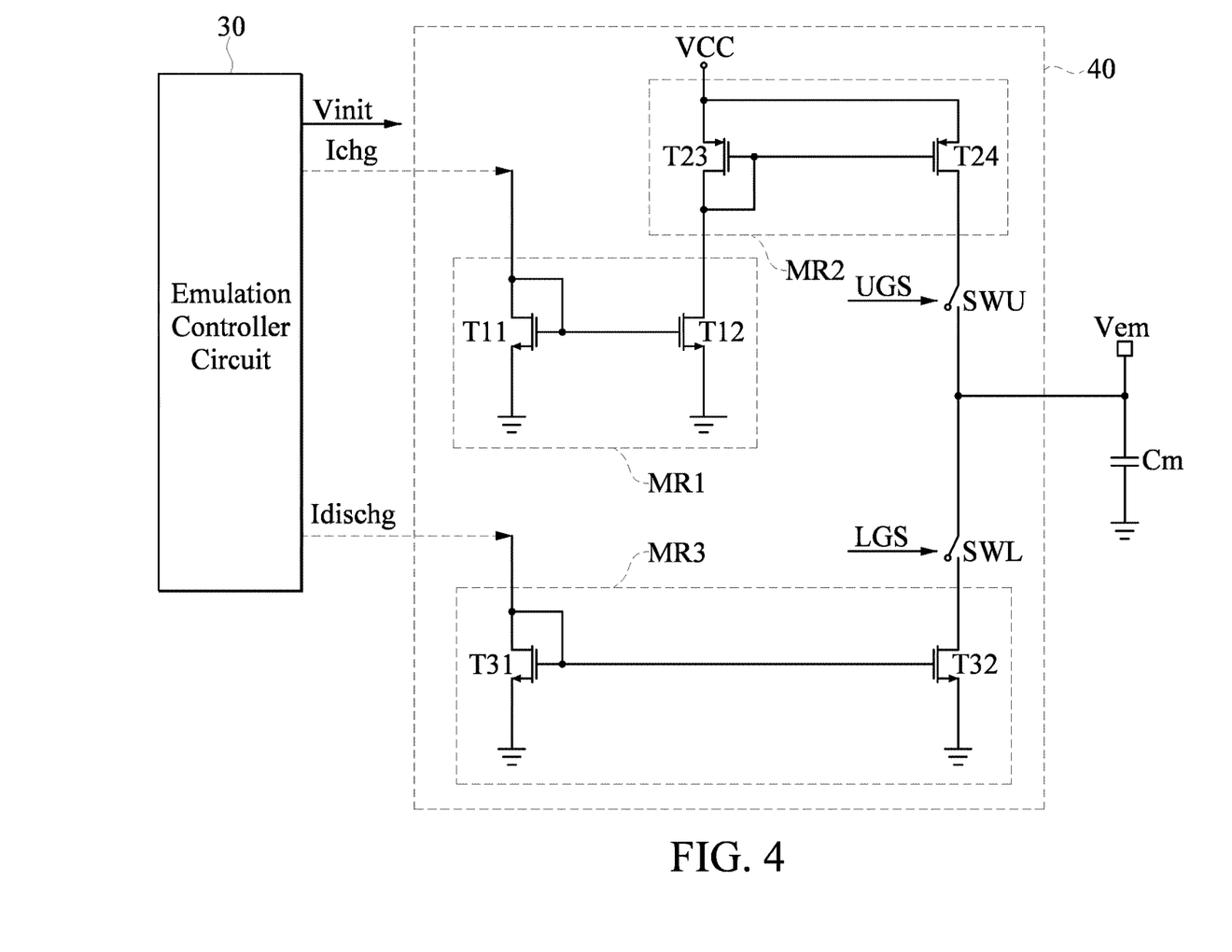
FIG. 4 is a block diagram of a charging and discharging circuit of an open-loop inductor current emulating circuit according to a third embodiment of the present disclosure.

Reference is made to FIG. 4, which is a block diagram of a charging and discharging circuit of an open-loop inductor current emulating circuit according to a third embodiment of the present disclosure.

The open-loop inductor current emulating circuit of the third embodiment of the present disclosure may include the charging and discharging circuit 40 as shown in FIG. 4. The charging and discharging circuit 40 shown in FIG. 1 may be the same as that shown in FIG. 4, but the present disclosure is not limited thereto.

The charging and discharging circuit 40 may include one or more current mirrors such as, but not limited to a first charging current mirror MR1, a second charging current mirror MR2 and a first discharging current mirror MR3. If necessary, the charging and discharging circuit 40 further includes one or more switch components such as, but not limited to a charging switch SWU and a discharging switch SWL.

For example, the first charging current mirror MR1 may include a first transistor T11 and a second transistor T12, the second charging current mirror MR2 may include a third transistor T23 and a fourth transistor T24, and the first discharging current mirror MR3 may include a first transistor T31 and a second transistor T32, but the present disclosure is not limited thereto.

A first terminal of the first transistor T11 of the first charging current mirror MR1 of the charging and discharging circuit 40 (that is an input terminal of the first charging current mirror MR1) is connected to the output terminal of the emulation controller circuit 30.

In the first charging current mirror MR1 of the charging and discharging circuit 40, the first terminal of the first transistor T11 is connected to a control terminal of the first transistor T11 and a control terminal of the second transistor T12, and a second terminal of the first transistor T11 and a second terminal of the second transistor T12 are grounded.

In the charging and discharging circuit 40, a first terminal of the second transistor T12 of the first charging current mirror MR1 (that is an output terminal of the first charging current mirror MR1) is connected to a second terminal of the third transistor T23 of the second charging current mirror MR2 (that is an input terminal of the second charging current mirror MR2.

In the second charging current mirror MR2 of the charging and discharging circuit 40, the second terminal of the third transistor T23 is connected to a control terminal of the third transistor T23 and a control terminal of the fourth transistor T24. A first terminal of the third transistor T23 and a first terminal of the fourth transistor T24 are coupled to a common voltage VCC.

In the charging and discharging circuit 40, a second terminal of the fourth transistor T24 is connected to a first terminal of the charging switch SWU. A second terminal of the charging switch SWU is connected to the first terminal of the capacitor Cm. A control terminal of the charging switch SWU may be connected to the output terminal of the driver circuit 10.

A first terminal of the first transistor T31 of the first discharging current mirror MR3 of the charging and discharging circuit 40 (that is an input terminal of the first discharging current mirror MR3) is connected to the output terminal of the emulation controller circuit 30.

In the first discharging current mirror MR3 of the charging and discharging circuit 40, the first terminal of the first transistor T31 is connected to a control terminal of the first transistor T31 and a control terminal of the second transistor T32. A second terminal of the first transistor T31 and a second terminal of the second transistor T32 are grounded.

In the charging and discharging circuit 40, a first terminal of the second transistor T32 of the first discharging current mirror MR3 (that is an output terminal of the first discharging current mirror MR3) is connected to a first terminal of the discharging switch SWL.

A second terminal of the discharging switch SWL is connected to the first terminal of the capacitor Cm. A control terminal of the discharging switch SWL may be connected to the output terminal of the driver circuit 10.

First, the first terminal of the first transistor T11 of the first charging current mirror MR1 receives a current of the charging current signal Ichg from the emulation controller circuit 30 as an input current of the first charging current mirror MR1. A current of the first terminal of the second transistor T12 of the first charging current mirror MR1 is an output current of the first charging current mirror MR1. A ratio of the input current and the output current of the first charging current mirror MR1 is 1:N, wherein N is a positive value. As a result, the charging current signal Ichg from the emulation controller circuit 30 is amplified or reduced by N times to form the output current of the first charging current mirror MR1.

An input current of the second terminal of the third transistor T23 of the second charging current mirror MR2 is the output current of the first charging current mirror MR1. A current of the second terminal of the fourth transistor T24 of the second charging current mirror MR2 is an output current of the second charging current mirror MR2. A ratio of the input current and the output current of the second charging current mirror MR2 is 1:M, wherein M is a positive value. As a result, the charging current signal Ichg is amplified or reduced by N×M times by the first charging current mirror MR1 and the second charging current mirror MR2.

On the other hand, the first terminal of the first transistor T31 of the first discharging current mirror MR3 receives a current of the discharging current signal Idischg from the emulation controller circuit 30 as an input current of the first discharging current mirror MR3. A current of the first terminal of the second transistor T32 of the first discharging current mirror MR3 is an output current of the first discharging current mirror MR3. A ratio of the input current and the output current of the first discharging current mirror MR3 is 1:P, wherein P is a positive value. As a result, the discharging current signal Idischg is amplified or reduced by P times by the first discharging current mirror MR3.

The driver circuit 10 alternatively turns on the high-side switch UG and the low-side switch LG. When the driver circuit 10 outputs the high-side conduction signal UGS (at a high level) to the control terminal of the high-side switch UG to turn on the high-side switch UG, the driver circuit 10 may output the high-side conduction signal UGS (at the high level) to the control terminal of the charging switch SWU to turn on the charging switch SWU. As a result, the charging current signal Ichg that is amplified or reduced by N×M times by the first charging current mirror MR1 and the second charging current minor MR2 flows through the charging switch SWU being turned on to the capacitor Cm to charge the capacitor Cm.

When the driver circuit 10 outputs the low-side conduction signal LGS (at a high level) to the control terminal of the low-side switch LG to turn on the low-side switch LG, the driver circuit 10 may output the low-side conduction signal LGS (at the high level) to the control terminal of the discharging switch SWL to turn on the discharging switch SWL. As a result, the discharging current signal Idischg that is amplified or reduced by P times by the first discharging current mirror MR3 flows through the discharging switch SWL being turned on to the capacitor Cm to discharge the capacitor Cm.

After the capacitor Cm is charged and discharged multiple times, the voltage signal of the capacitor Cm is the emulated voltage signal that is generated according to the inductor current IL of the power converter by the open-loop inductor current emulating circuit of the embodiment of the present disclosure.

Figure 5:
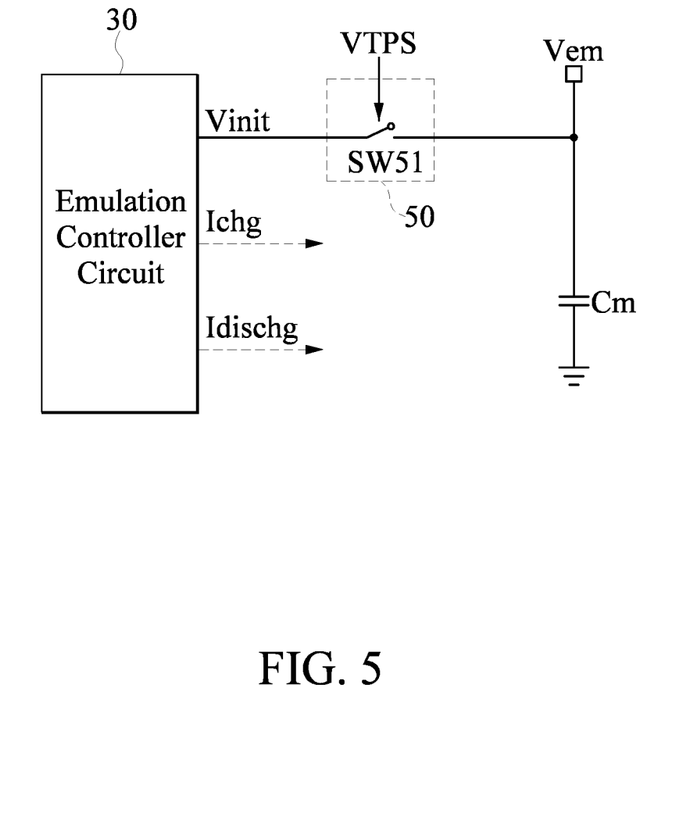
FIG. 5 is a block diagram of an initial control circuit of an open-loop inductor current emulating circuit according to a fourth embodiment of the present disclosure.

Reference is made to FIG. 5, which is a block diagram of an initial control circuit of an open-loop inductor current emulating circuit according to a fourth embodiment of the present disclosure.

The open-loop inductor current emulating circuit of the fourth embodiment of the present disclosure may include the initial control circuit 50 as shown in FIG. 5. The initial control circuit 50 shown in FIG. 1 may be the same as that shown in FIG. 5, but the present disclosure is not limited thereto.

As shown in FIG. 5, the initial control circuit 50 may include a switch component SW51. A first terminal of the switch component SW51 is connected to the output terminal of the emulation controller circuit 30. A second terminal of the switch component SW51 is connected to the first terminal of the capacitor Cm.

The control terminal of the switch component SW51 shown in FIG. 5 may be connected to the output terminal of the driver circuit 10 shown in FIG. 1, and may receive a valley time pulse signal VTPS from the output terminal of the driver circuit 10. Each time when the charging and discharging circuit 40 provides the discharging current to the capacitor Cm to discharge the voltage signal of the capacitor Cm to reach the time point of the valley value of the inductor current IL according to the discharging current signal Idischg, the switch component SW51 is turned on according to the valley time pulse signal VTPS.

The emulation controller circuit 30 outputs the initial signal Vinit through the switch component SW51 being turned on to the capacitor Cm to pull down the voltage of the voltage signal of the capacitor Cm to the valley voltage. As a result, the open-loop inductor current emulating circuit of the embodiment of the present disclosure more smoothly emulates the inductor current IL of the power converter to generate the emulated voltage signal.

Figure 6:
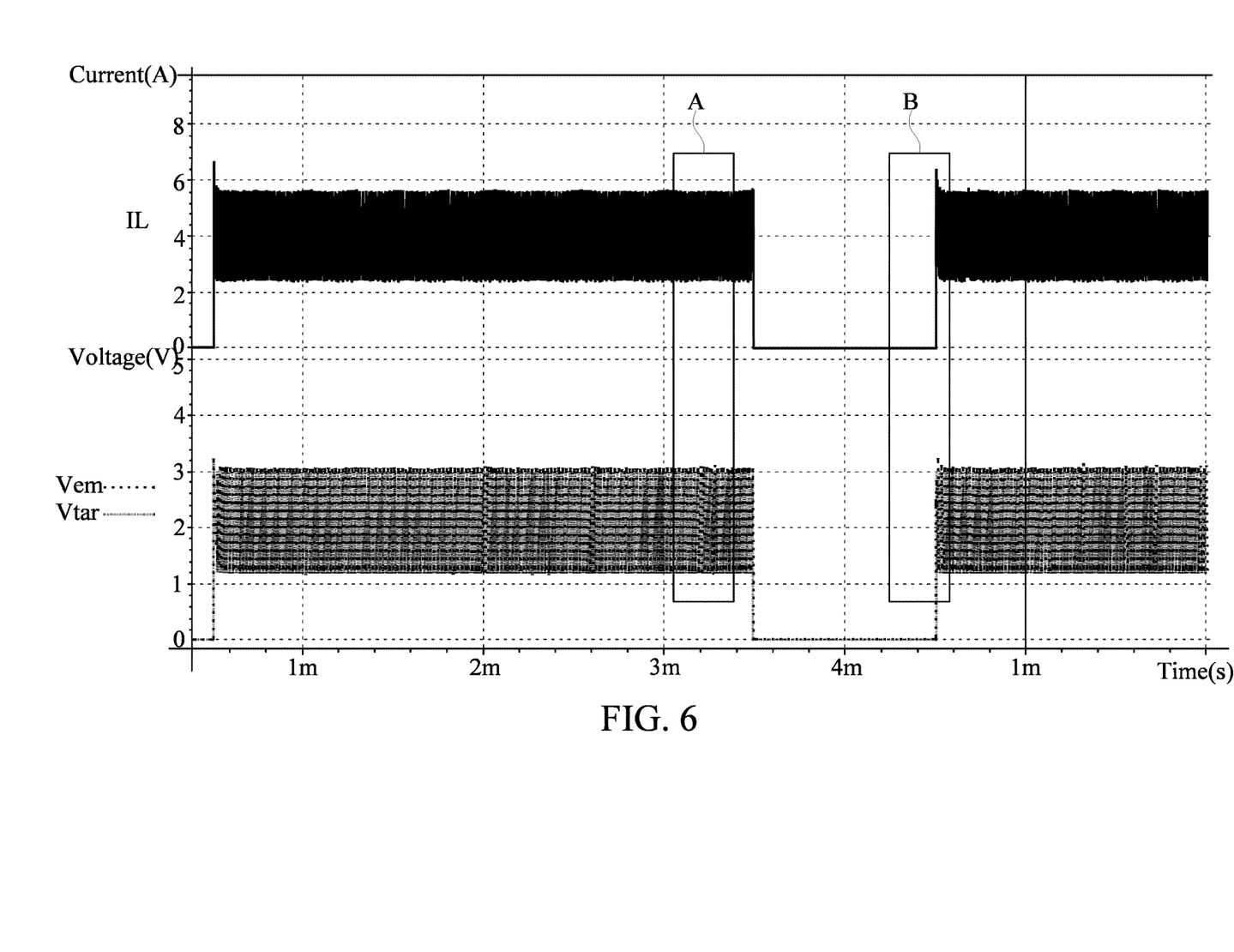
FIG. 6 is a waveform diagram of a inductor current, an emulated voltage signal and a preset voltage signal that are sensed by the open-loop inductor current emulating circuit according to the first to fourth embodiments of the present disclosure.
Figure 7:
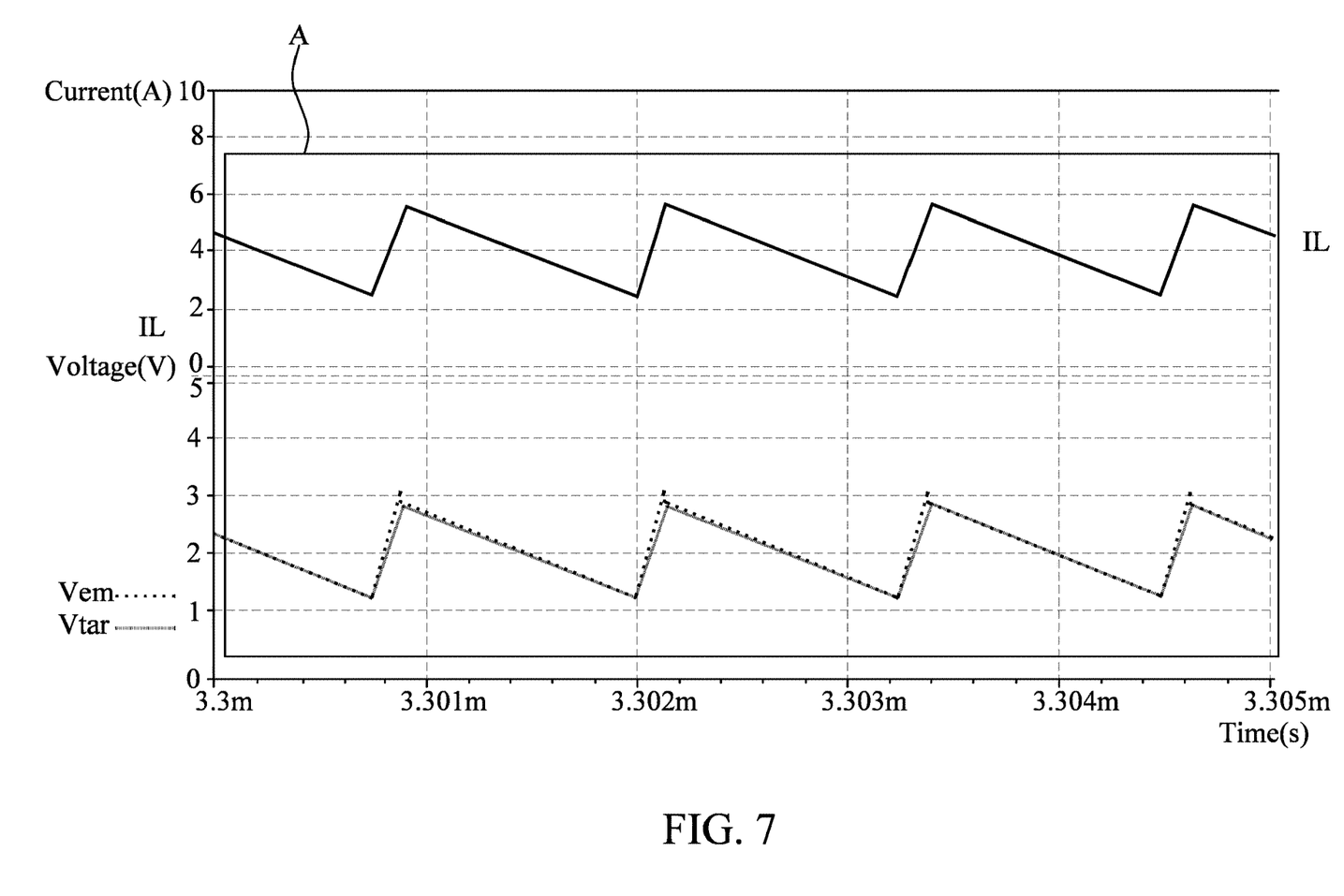
FIG. 7 is an enlarged view of waveforms shown in a line A of FIG. 6.
Figure 8:
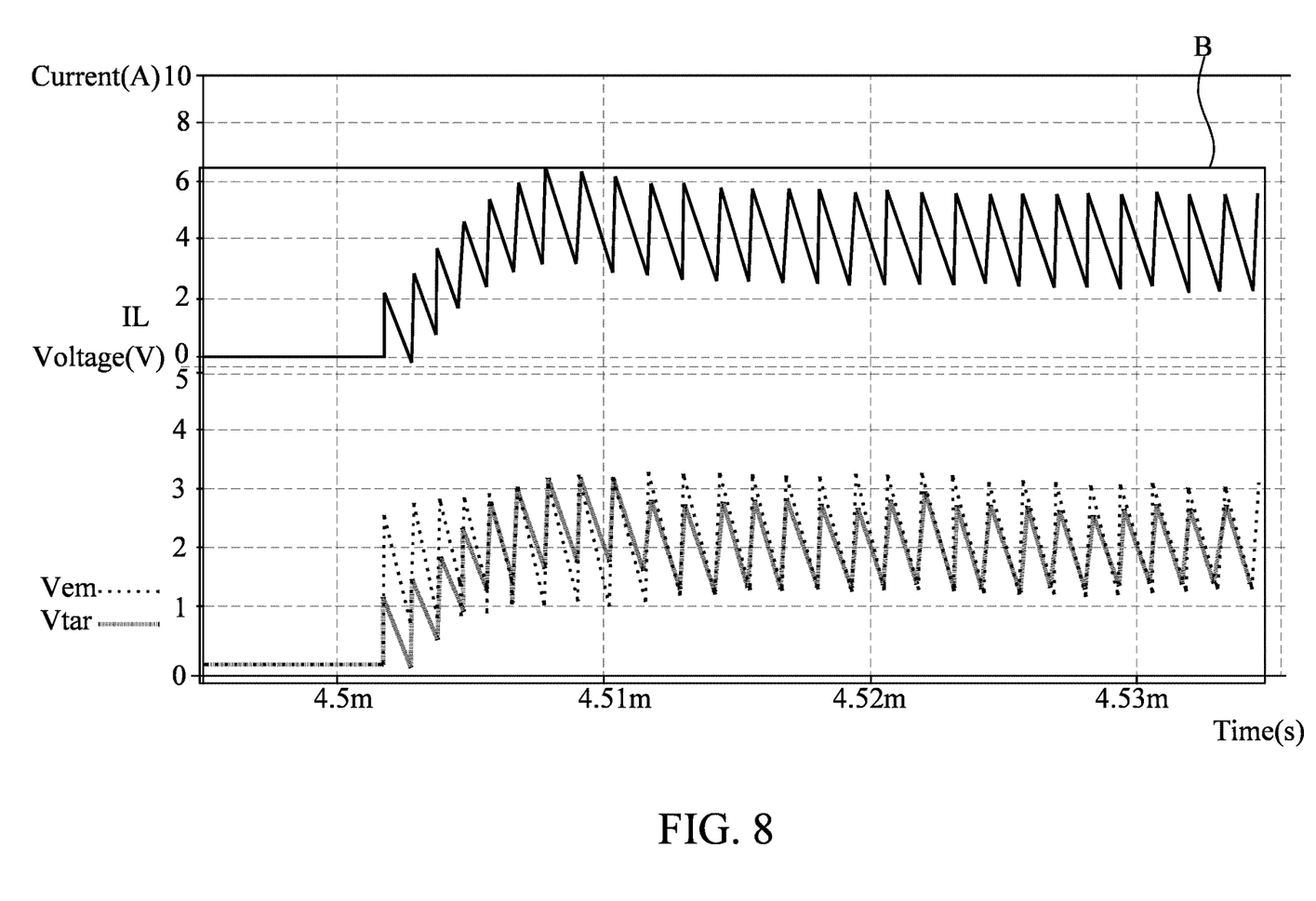
FIG. 8 is an enlarged view of waveforms shown in a line B of FIG. 6.
Figure 9:
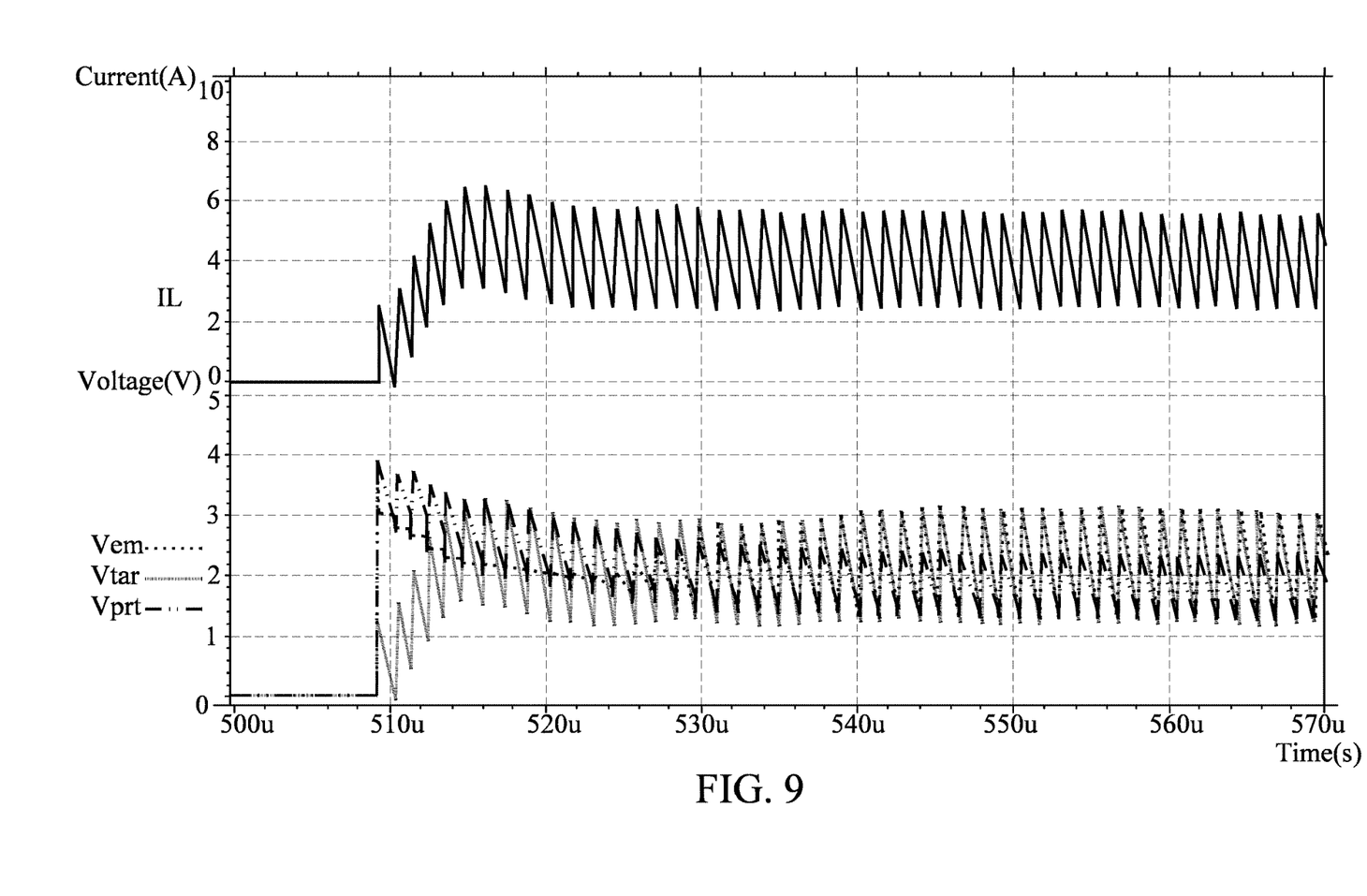
FIG. 9 is a waveform diagram of the inductor current, the emulated voltage signal and the preset voltage signal that are sensed by the open-loop inductor current emulating circuit of the first to fourth embodiments of the present disclosure and an emulated voltage signal generated by a conventional inductor current emulating circuit.

Reference is made to FIGS. 5 to 9, in which FIG. 6 is a waveform diagram of a inductor current, an emulated voltage signal and a preset voltage signal that are sensed by the open-loop inductor current emulating circuit according to the first to fourth embodiments of the present disclosure, FIG. 7 is an enlarged view of waveforms shown in a line A of FIG. 6, FIG. 8 is an enlarged view of waveforms shown in a line B of FIG. 6, and FIG. 9 is a waveform diagram of the inductor current, the emulated voltage signal and the preset voltage signal that are sensed by the open-loop inductor current emulating circuit of the first to fourth embodiments of the present disclosure and an emulated voltage signal generated by a conventional inductor current emulating circuit.

As shown in FIGS. 6 to 9, a voltage value of a preset voltage signal Vtar is half of the inductor current IL (that is a current of the inductor L as shown in FIG. 1).

As shown in FIGS. 6 to 8, the open-loop inductor current emulating circuit of the present disclosure emulates the inductor current IL of the power converter to generate an emulated voltage signal Vem that is substantially the same as the preset voltage signal Vtar.

As shown in FIG. 9, the conventional inductor current emulating circuit emulates the inductor current IL of the power converter to generate an emulated voltage signal Vprt. It is apparent that, the emulated voltage signal Vem generated by the conventional inductor current emulating circuit slowly reaches voltages of the preset voltage signal Vtar. In contrast, the emulated voltage signal Vem generated by the open-loop inductor current emulating circuit of the present disclosure more quickly reaches the voltages of the preset voltage signal Vtar.

In conclusion, the present disclosure provides the open-loop inductor current emulating circuit. The configurations of the open-loop inductor current emulating circuit are different from that of the conventional inductor current emulating circuit. The open-loop inductor current emulating circuit of the present disclosure detects the currents of the rising waveform segments and the falling waveform segments of the plurality of waveforms of the current sensed signal of the low-side switch of the power converter. The open-loop inductor current emulating circuit of the present disclosure accurately and quickly emulates complete information of the inductor current according to the detected currents.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An open-loop inductor current emulating circuit, which is applicable to a power converter, wherein the power converter includes a driver circuit, a high-side switch, a low-side switch, an inductor and an output capacitor, an output terminal of the driver circuit is connected to a control terminal of the high-side switch and a control terminal of the low-side switch, a first terminal of the high-side switch is coupled to an input voltage, a second terminal of the high-side switch is connected to a first terminal of the low-side switch, a second terminal of the low-side switch is grounded, a node between the second terminal of the high-side switch and the first terminal of the low-side switch is connected to a first terminal of the inductor, a second terminal of the inductor is connected to a first terminal of the output capacitor, and a second terminal of the output capacitor is grounded, the open-loop inductor current emulating circuit comprising:

a current sensor circuit connected to the first terminal of the low-side switch and configured to sense a current flowing through the first terminal of the low-side switch to output a current sensed signal, wherein a plurality of waveform segments of a plurality of waveforms of the current sensed signal includes a plurality of rising waveform segments and a plurality of falling waveform segments;

an emulation controller circuit connected to the current sensor circuit, wherein the emulation controller circuit is configured to output a plurality of charging current signals respectively according to a plurality of currents on the plurality of rising waveform segments of the current sensed signal, and the emulation controller circuit is configured to output a plurality of discharging current signals respectively according to a plurality of currents of the plurality of falling waveform segments of the current sensed signal;

a charging and discharging circuit connected to the emulation controller circuit and a first terminal of a capacitor, wherein a second terminal of the capacitor is grounded, the charging and discharging circuit is configured to generate a plurality of charging currents respectively according to the plurality of charging current signals, the charging and discharging circuit is configured to generate a plurality of discharging currents respectively according to the plurality of discharging current signals, the charging and discharging circuit is configured to alternatively output the plurality of charging current signals and the plurality of discharging currents to the capacitor to charge and discharge the capacitor multiple times, and a current signal of the capacitor that is charged and discharged multiple times is an emulated voltage signal of an inductor current of the inductor; and an initial control circuit connected to the emulation controller circuit and the first terminal of the capacitor, wherein the emulation controller circuit generates an initial signal according to a valley current of the current sensed signal, and the initial control circuit transits the initial signal from the emulation controller circuit to the capacitor to pull down a voltage of a voltage signal of the capacitor to a valley voltage.

2. The open-loop inductor current emulating circuit according to claim 1, wherein the initial control circuit includes a switch component, a first terminal of the switch component is connected to an output terminal of the emulation controller circuit, a second terminal of the switch component is connected to the first terminal of the capacitor, a control terminal of the switch component receives a valley time pulse signal from an external circuit, and the switch component is turned on or off according to a level of the valley time pulse signal.

3. The open-loop inductor current emulating circuit according to claim 1, wherein the emulation controller circuit includes a sample and hold circuit configured to sample and hold the plurality of currents on the plurality of waveform segments of the current sensed signal.

4. The open-loop inductor current emulating circuit according to claim 3, wherein the plurality of currents being sampled and held by the sample and hold circuit include a current that is generated when a current time reaches half of an on-time of the low-side switch.

5. The open-loop inductor current emulating circuit according to claim 3, wherein the emulation controller circuit further includes a sensed current difference calculator circuit connected to the sample and hold circuit, the sample and hold circuit samples and holds a first current at a first time point on each of the plurality of waveform segments of the current sensed signal, the sample and hold circuit samples and holds a second current at a second time point on each of the plurality of waveform segments of the current sensed signal, and the sensed current difference calculator circuit calculates a current difference between the first current and the second current.

6. The open-loop inductor current emulating circuit according to claim 5, wherein the emulation controller circuit further includes a slope current calculator circuit, the slope current calculator circuit calculates a time difference between the first time point and the second time point on each of the plurality of waveform segments of the current sensed signal, and the slope current calculator circuit calculates a slope and currents of each of the plurality of waveform segments of the current sensed signal according to the current difference and the time difference on each of the plurality of waveform segments of the current sensed signal.

7. The open-loop inductor current emulating circuit according to claim 6, wherein the slope current calculator circuit outputs each of the plurality of charging current signals according to the slope and the currents of each of the plurality of rising waveform segments of the current sensed signal, and the slope current calculator circuit outputs each of the plurality of discharging current signals according to the slope and the currents of each of the plurality of falling waveform segments of the current sensed signal.

8. The open-loop inductor current emulating circuit according to claim 1, wherein the charging and discharging circuit includes a first charging current mirror, an input terminal of the first charging current mirror is connected to an output terminal of the emulation controller circuit and configured to receive each of the plurality of charging current signals, and an output terminal of the first charging current mirror is connected to the first terminal of the capacitor.

9. The open-loop inductor current emulating circuit according to claim 8, wherein the charging and discharging circuit further includes a second charging current mirror, an input terminal of the second charging current mirror is connected to an output terminal of the first charging current mirror, and an output terminal of the second charging current mirror is connected to the first terminal of the capacitor.

10. The open-loop inductor current emulating circuit according to claim 9, wherein the charging and discharging circuit further includes a charging switch, a first terminal of the charging switch is connected to the output terminal of the second charging current mirror, a second terminal of the charging switch is connected to the first terminal of the capacitor, a control terminal of the charging switch is connected to the driver circuit, and the driver circuit turns on the high-side switch and the charging switch at the same time.

11. The open-loop inductor current emulating circuit according to claim 10, wherein the first charging current mirror includes a first transistor and a second transistor, a first terminal of the first transistor is connected to the output terminal of the emulation controller circuit, a control terminal of the first transistor and a control terminal of the second transistor, a first terminal of the second transistor is connected to the input terminal of the second charging current mirror, and a second terminal of the first transistor and a second terminal of the second transistor are grounded.

12. The open-loop inductor current emulating circuit according to claim 11, wherein the second charging current mirror includes a third transistor and a fourth transistor, a first terminal of the third transistor and a first terminal of the fourth transistor are coupled to a common voltage, a second terminal of the third transistor is connected to the first terminal of the second transistor, a control terminal of the third transistor and a control terminal of the fourth transistor, and a second terminal of the fourth transistor is connected to the first terminal of the charging switch.

13. The open-loop inductor current emulating circuit according to claim 1, wherein the charging and discharging circuit includes a first discharging current mirror, an input terminal of the first discharging current mirror is connected to an output terminal of the emulation controller circuit and configured to receive each of the plurality of discharging current signals, and an output terminal of the first discharging current mirror is connected to the first terminal of the capacitor.

14. The open-loop inductor current emulating circuit according to claim 13, wherein the charging and discharging circuit further includes a discharging switch, a first terminal of the discharging switch is connected to the output terminal of the first discharging current mirror, a second terminal of the discharging switch is connected to the first terminal of the capacitor, a control terminal of the discharging switch is connected to the driver circuit, and the driver circuit turns on the low-side switch and the discharging switch at the same time.

15. The open-loop inductor current emulating circuit according to claim 14, wherein the first discharging current mirror includes a first transistor and a second transistor, a first terminal of the first transistor is connected to the output terminal of the emulation controller circuit, a control terminal of the first transistor and a control terminal of the second transistor, a first terminal of the second transistor is connected to the first terminal of the discharging switch, and a second terminal of the first transistor and a second terminal of the second transistor are grounded.

* * * * *